United States Patent
Mueller et al.

(10) Patent No.: US 11,487,506 B2
(45) Date of Patent: Nov. 1, 2022

(54) CONDITION CODE ANTICIPATOR FOR HEXADECIMAL FLOATING POINT

(71) Applicant: International Business Machines Corporation, Armonk, NY (US)

(72) Inventors: Silvia Melitta Mueller, Altdorf (DE); Petra Leber, Ehningen (DE); Kerstin Claudia Schelm, Stuttgart (DE); Cedric Lichtenau, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 187 days.

(21) Appl. No.: 16/536,663

(22) Filed: Aug. 9, 2019

(65) Prior Publication Data

US 2021/0042088 A1 Feb. 11, 2021

(51) Int. Cl.
*G06F 7/499* (2006.01)
*G06F 7/483* (2006.01)
*G06F 9/30* (2018.01)

(52) U.S. Cl.
CPC .......... *G06F 7/49915* (2013.01); *G06F 7/483* (2013.01); *G06F 9/30094* (2013.01); *G06F 2207/3844* (2013.01)

(58) Field of Classification Search
CPC .. G06F 9/30094; G06F 7/49915; G06F 7/483; G06F 2207/3844; G06F 7/49905–49915; G06F 7/49921; G06F 7/49936; G06F 9/30101
USPC ....................................................... 708/525
See application file for complete search history.

(56) References Cited

U.S. PATENT DOCUMENTS

| | | | | |
|---|---|---|---|---|
| 4,947,359 A | * | 8/1990 | Vassiliadis | G06F 7/026 708/210 |
| 5,694,350 A | * | 12/1997 | Wolrich | G06F 7/535 708/670 |
| 5,862,065 A | * | 1/1999 | Muthusamy | G06F 7/506 708/521 |
| 7,058,830 B2 | | 6/2006 | Dhong et al. | |
| 7,886,133 B2 | | 2/2011 | Watanabe | |
| 8,555,039 B2 | | 10/2013 | Rychlik | |

(Continued)

FOREIGN PATENT DOCUMENTS

EP 0992884 B1 12/2004

OTHER PUBLICATIONS

"IBM Hexadecimal Floating-Point." Wikipedia, Wikimedia Foundation, Aug. 14, 2016, en.wikipedia.org/w/index.php?title=IBM_hexadecimal_floating-point&direction=prev&oldid=734514901. (Year: 2016).*

(Continued)

*Primary Examiner* — Matthew D Sandifer
*Assistant Examiner* — Huy Duong
(74) *Attorney, Agent, or Firm* — Cantor Colburn LLC; Edward Wixted

(57) ABSTRACT

An aspect includes executing, by a binary based floating-point arithmetic unit of a processor, a calculation having two or more operands in hexadecimal format based on a hexadecimal floating-point (HFP) instruction and providing a condition code for a calculation result of the calculation. The floating-point arithmetic unit includes a condition code anticipator circuit that is configured to provide the condition code to the processor prior to availability of the calculation result.

20 Claims, 14 Drawing Sheets

(56) References Cited

U.S. PATENT DOCUMENTS

| | | |
|---|---|---|
| 8,838,665 B2 | 9/2014 | Pitkethly |
| 9,684,514 B2 | 6/2017 | Carlough et al. |
| 9,684,515 B2 | 6/2017 | Carlough et al. |
| 11,023,205 B2 | 6/2021 | Lichtenau et al. |
| 2008/0052683 A1 | 2/2008 | Bates |
| 2008/0276072 A1 | 11/2008 | Rychlik |
| 2015/0378679 A1 | 12/2015 | Dao et al. |
| 2015/0378680 A1 | 12/2015 | Dao et al. |
| 2017/0235574 A1 | 8/2017 | Carlough et al. |
| 2018/0329684 A1 | 11/2018 | Hack et al. |

OTHER PUBLICATIONS

Leber et al.; "Efficient Checking of a Condition Code Anticipator for a Floating Point Processor and/or Unit"; U.S. Appl. No. 16/536,671, filed Aug. 9, 2019.

Lichtenau et al.; "Quad Precision Floating Point on the IBM z13™"; 2016 IEEE 23nd Symposium on Computer Arithmetic; 8 pages.

List of IBM Patents or Patent Applications Treated as Related; Date Filed: Aug. 9, 2019, 2 pages.

Transmittal Form PTO/SB/21, signed Mar. 17, 2020.

\* cited by examiner

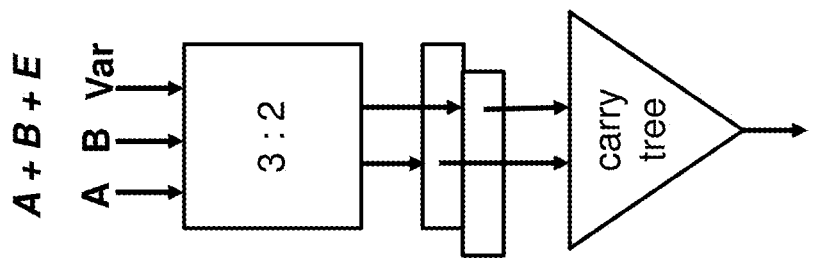
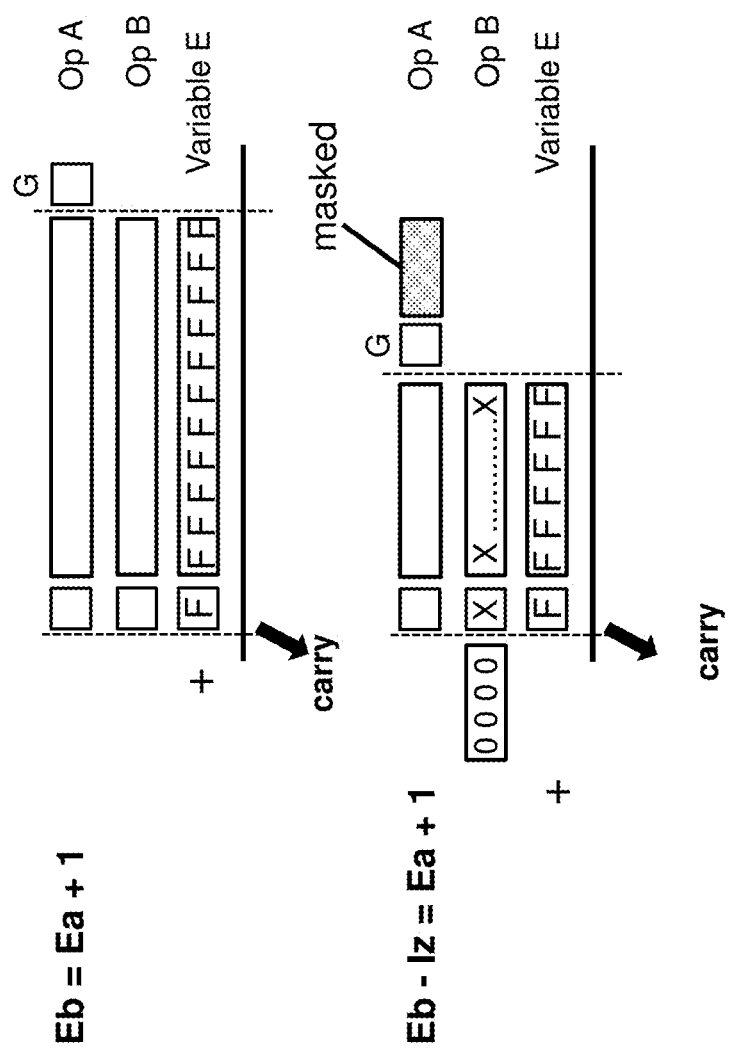
FIG. 6

Effadd: variable G
Effsub: variable H

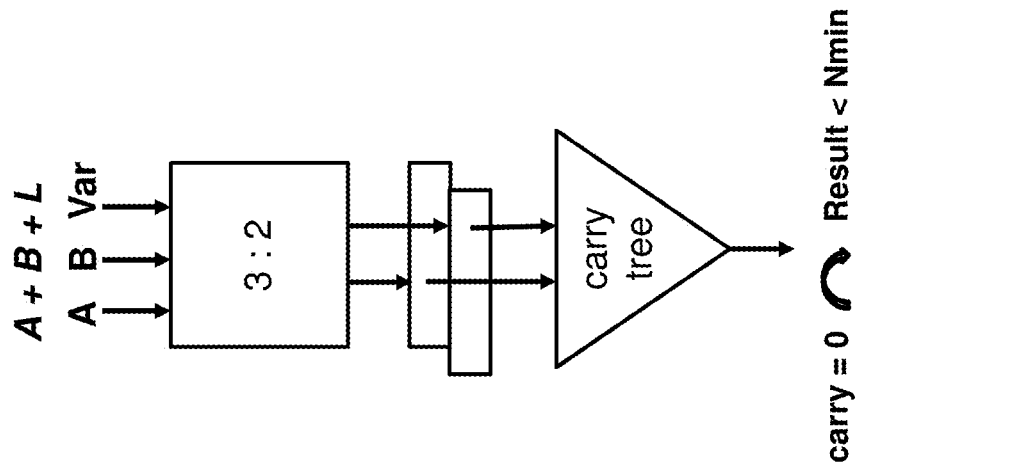
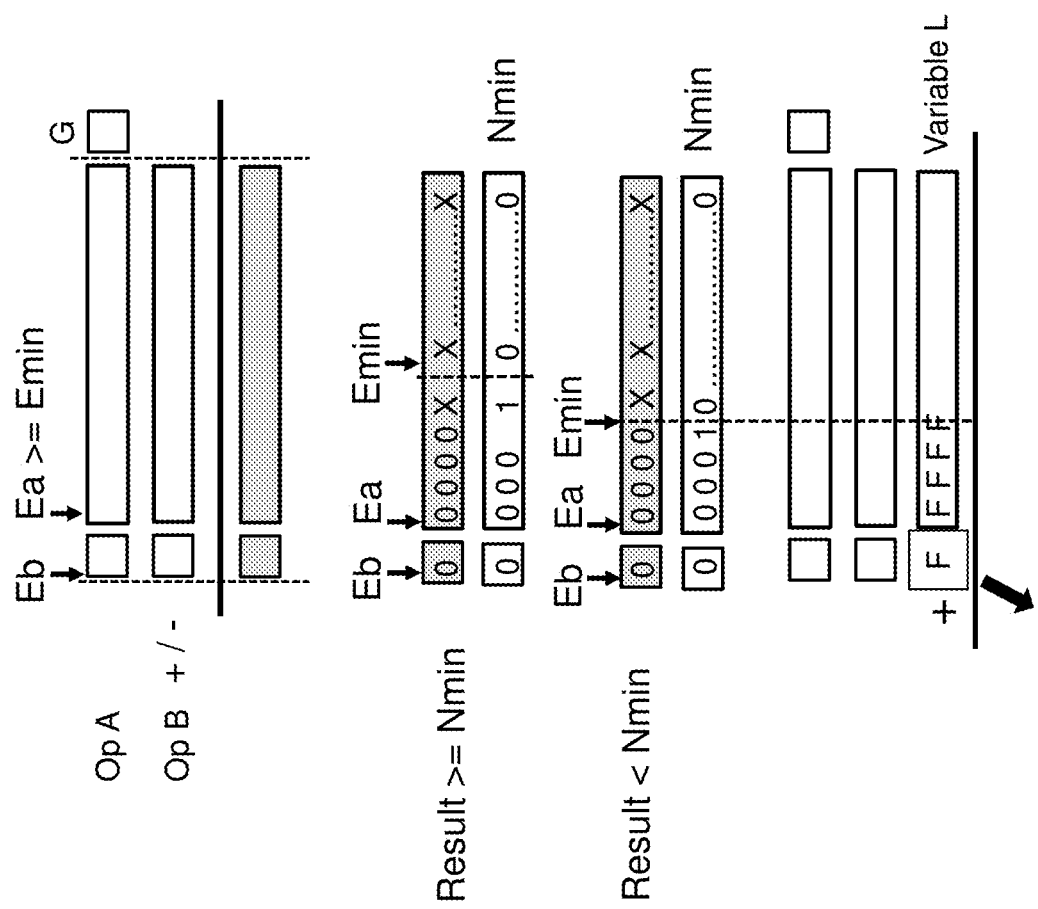
FIG. 13

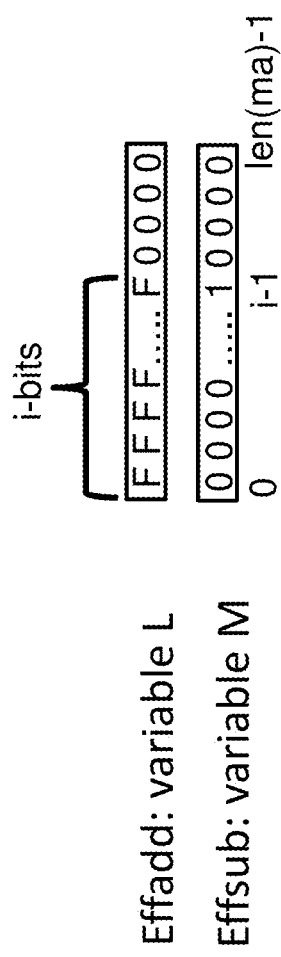
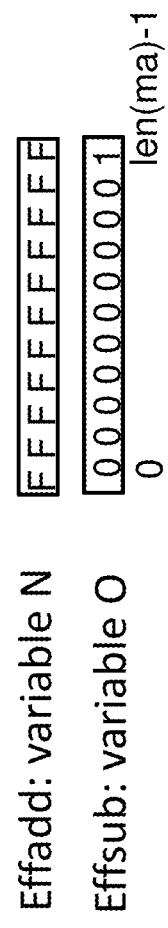
FIG. 14
FIG. 15

CONDITION CODE ANTICIPATOR FOR HEXADECIMAL FLOATING POINT

BACKGROUND

The present invention generally relates to floating point units, and more specifically, to a condition code anticipator (CCA) for a hexadecimal floating point unit.

Floating point numbers are used in computing systems to represent a large range of numbers via a limited number of bits. Floating point numbers are represented by a number value and an exponent associated with that number value. Some computing systems utilize a dedicated unit known as floating point unit to handle floating point numbers computation.

Modern processors use special conditions, like overflow or values of the result such as result equal zero, to branch to a different part of a program. These special conditions and values of the result are called condition codes. To increase performance, it is desirable to have the condition code outcome as soon as possible to determine if a branch instruction that is dependent on the computed floating point operation will take the branch or not.

SUMMARY

Embodiments of the present invention provide a computer-implemented method for executing a hexadecimal based condition code anticipator. A non-limiting example of the computer-implemented method includes executing, by a binary based floating-point arithmetic unit of a processor, a calculation having two or more operands in hexadecimal format based on hexadecimal floating-point instructions. The method also includes providing, by the floating-point arithmetic unit, a condition code for a calculated result of the instruction, in which the floating-point arithmetic unit includes a condition code anticipator circuit that is configured to provide the condition code to the processor prior to availability of the calculation result.

Embodiments of the present invention provide a system for executing a hexadecimal based condition code anticipator. A non-limiting example of the system includes a binary based floating-point arithmetic unit and one or more processors configured to perform a method that includes executing, by the binary based floating-point arithmetic unit, a calculation having two or more operands in hexadecimal format based on hexadecimal floating-point instructions. The method also includes providing, by the floating-point arithmetic unit, a condition code for a calculated result of the instruction, in which the floating-point arithmetic unit includes a condition code anticipator circuit that is configured to provide the condition code to a processor prior to availability of the calculation result.

Embodiments of the invention provide a computer program product for executing a hexadecimal based condition code anticipator, the computer program product comprising a computer readable storage medium having program instructions embodied therewith. The program instructions are executable by a system comprising one or more processors to cause the system to perform a method that includes executing, by a binary based floating-point arithmetic unit of a processor of the system, a calculation comprising two or more operands in hexadecimal format based on hexadecimal floating-point instructions. The method also includes providing, by the floating-point arithmetic unit, a condition code for a calculated result of the instruction, in which the floating-point arithmetic unit includes a condition code anticipator circuit that is configured to provide the condition code to the processor prior to availability of the calculation result.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of an example effective hexadecimal unnormalized addition operation and associated carry tree of a first of the set of second alignment cases of FIG. 5 in accordance with one or more embodiments of the present invention, in which a first variable (i.e., variable E) is utilized;

FIG. 13 depicts a block diagram of an example effective addition operation and associated carry tree of a case 2B normalized zero detection in accordance with one or more embodiments of the present invention, in which in a fifth variable (i.e., variable L) and/or sixth variable (i.e., variable M) are utilized;

FIG. 14 depicts a block diagram of example fifth and sixth variables in accordance with one or more embodiments of the present invention;

FIG. 15 depicts a block diagram of example seventh and eight variables (i.e., variable N and variable O) of a third alignment case (i.e., case 3) for hexadecimal normalized zero detection in accordance with one or more embodiments of the present invention;

Figure 1:
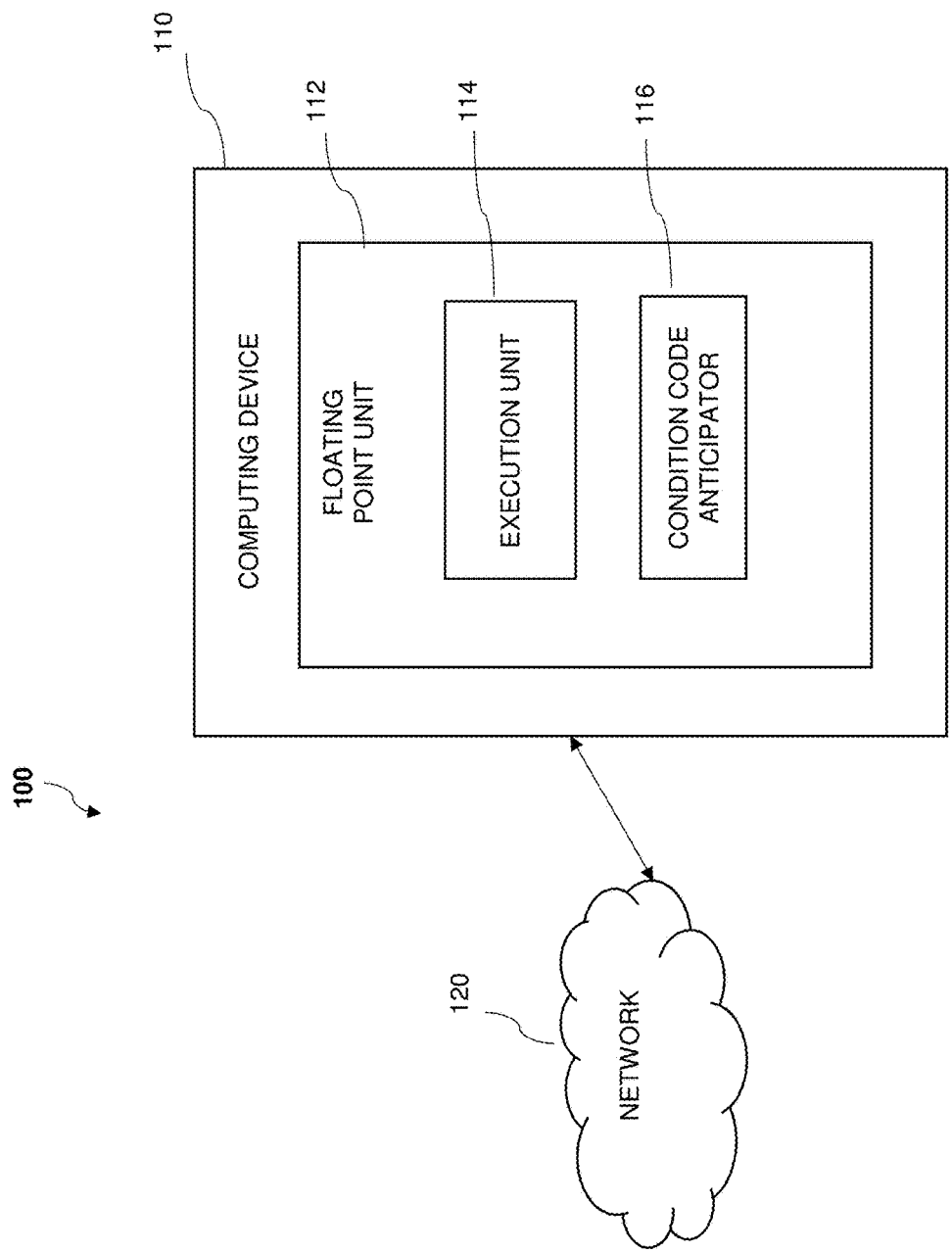
FIG. 1 depicts a functional block diagram illustrating a computing environment having a floating point unit according to one or more embodiments of the invention.

The diagrams depicted herein are illustrative. There can be many variations to the diagrams or the operations described therein without departing from the spirit of the invention. For instance, the actions can be performed in a differing order or actions can be added, deleted, or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide a condition code anticipator (CCA) that is able to calculate, for hexadecimal format, a condition code (CC) in parallel with a main data path, in which the CCA is able to handle special cases such as, for example, when a data result is zero for normalized or unnormalized hexadecimal formatted data.

A floating-point arithmetic unit (FPU) for a processor is provided, which is configured to perform calculations with at least two operands in hexadecimal format and to provide a condition code for the calculated result. In some embodiments of the present invention, the FPU includes a CCA circuit that is configured to provide a condition code for a calculation operation that is currently being performed to provide the condition code prior to the availability of the calculation results. This can be advantageous from a performance perspective and is particularly useful in cases where special exceptions are found to apply to operands.

Turning now to an overview of technologies that are more specifically relevant to aspects of the invention, some systems in the art support binary and decimal floating-point. U.S. Pat. No. 9,684,514 provides one such example of a binary and decimal CCA. However, such systems are unable to support hexadecimal floating format.

Hexadecimal floating-point arithmetic (HFP) is used in various system such as, for example, COBOL, PL/1, Hitachi systems, and/or other suitable systems. Some known applications rely on control structures that implement if-then-else statements. For those structures, a condition code (CC) may be utilized to determine which path a particular computer instruction is to take to control a branch unit in the processor core and to decide whether a branch is to be taken. As such, the latency of detecting the condition code and resolving the branch can strongly impact the performance of the applications.

When it comes to the handing of condition codes for HFP, there are two main schemes to compute the condition code. The first scheme generally includes an HFP instruction that computes a number-line result, and a second instruction that is an HFP compare instruction that generates the condition code for the number-line result. The second scheme generally includes an HFP instruction that computes the number-line result and the condition code, and then in the execution of the instruction, the condition code is detected based on the number-line result (i.e., condition code detection starts after the number-line result is computed). One potential drawback of such an implementation is that condition code detection starts only after computing the number-line result, which can add to the latency of the condition code detection and branch resolution. In other words, the execution time of the overall application is increased.

In contrast, when it comes to the handing of condition codes for binary and decimal FPU, a condition code anticipator such as the one described in U.S. Pat. No. 9,684,514 may be utilized, which describes the use of a condition code anticipator for binary and decimal floating-point operations. The condition code anticipator for binary and decimal floating-point operations, as described therein, allows for the computing of a condition code in parallel to the number-line result, reducing the latency of the condition code by several processor cycles. One drawback of the implementation set forth in the referenced patent is that such implementation can only be applied to binary and decimal floating-point code, and not to hexadecimal floating-point code. Due to the set of corner cases that are unique to HFP, the condition code detection set forth in the referenced patent is not capable of HFP addition and subtraction.

One or more embodiments of the invention address one or more of the above-described shortcomings of the prior art by providing a condition code anticipator that allows for condition code detection and branch handling of HFP code in a manner that is able to cover various HFP corner cases to detect an HFP zero result. For example, in contrast to binary and decimal floating-point where a zero result condition code is flagged only for a true mathematically zero of a full precision intermediate result, in some embodiments of the present invention, the condition code anticipator for handing HFP code allows for cases where a non-zero, full precision intermediate result is flagged in the condition code as being a zero result even though the full precision intermediate result is mathematically non-zero. In accordance with one or more embodiments of the present invention, the condition code anticipator allows for the starting of the condition code computation for HFP add/subtract instructions in parallel to computing the number-line result. For high-frequency processor cores such as, for example, IBM® Z mainframes, which implement HFP, one or more embodiments of the condition code anticipator can be used to reduce the condition code latency by, for example, two cycles. Speeding up the condition code detection and branch resolution by two cycles can result in a visible performance gain.

Turning now to a more detailed description of aspects of the present invention, FIG. 1 depicts a functional block diagram illustrating a computing environment 100 having a floating point unit according to one or more embodiments of the invention. Computing environment 100 includes a computing device 110 connected over network 120. Computing device 110 includes a floating point unit 112. In some embodiments of the present invention, floating point unit 112 includes circuit logic for controlling operation of an execution unit 114 and a condition code anticipator 116.

In some embodiments of the present invention, computing device 110 is a computing device that can be, for example, a standalone device, a server, a laptop computer, a tablet computer, a netbook computer, a personal computer (PC), or a desktop computer. In some embodiments of the present invention, computing device 110 is a computing system that utilized clustered computers and components to act as a single pool of seamless resources. In general, computing device 110 can be any suitable computing device or a combination of devices that have access to floating point unit 112 and are capable of executing execution unit 114 and condition code anticipator 116. Computing device 110 may include internal and external hardware components, as depicted and described in further detail with respect to FIG. 18. In some embodiments of the present invention, floating point unit 112 is a component of computer processor(s) 1802. In some embodiments of the present invention, floating point unit 112 is a separate component of computing device 110.

In some embodiments of the present invention, as shown in FIG. 1, execution unit 114 and condition code anticipator (CCA) 116 are located on floating point unit 112. However, in other embodiments, execution unit 114 and/or condition code anticipator 116 may be located externally to the floating point unit 112.

In some embodiments of the present invention, floating point unit 112 is configured to perform arithmetic and/or logic operations on floating point numbers. Computing device 110 stores the representation of a floating point number in main memory 1810 or secondary memory 1812, as discussed below in reference to FIG. 18. In some embodiments of the present invention, the representation of the floating point number includes a sign (i.e., positive or negative), a significand, and an exponent. In some embodiments of the present invention, due to the standardization of the representation on computing device 110 (e.g., a certain representation is designed with a specific base to be used such as binary with base 2, decimal with base 10 or hexadecimal with base 16), the base of the floating point number is omitted from the representation when storing. Computing device 110 stores the representation of a floating point number with a finite precision of digits such as bits, in which the significand and exponent are allocated a certain number of digits.

As noted above, due to the finite amount of memory that may be allocated for storing a floating number representation, in some embodiments of the present invention, computing device 110 stores only a predetermined range of real numbers for a given floating point representation. As such, in some embodiments of the present invention, floating point unit 112 may only perform operations with floating point numbers and produce results within the predetermined range. The number of digits or bits for the exponent is the primary component that determines the size of this range.

In some embodiments of the present invention, execution unit 114 is configured to perform instructions or operations and generate a result or resultant based on the instructions or operations. Floating point unit 112 receives instructions from computing device 110 to perform arithmetic and logic operations on one or more operands. For example, consider a scenario where floating point unit 112 receives a request to add two operands denoted A and B. Based on the received instruction, floating point unit 112 then sends the received operands to execution unit 114 to perform the instruction. Execution unit 114 performs the requested instruction (e.g., add operation) using the received operands (e.g., A and B). Execution unit 114 generates a data result (e.g., C) or value based on the received instruction or operation (e.g., C=A+B) when performed using the one or more operands. Operands represent input floating point values to be processed by floating point unit 112. The components of the operands define their respective floating point values by: the sign (+/−), exponent, and significand or mantissa.

In some embodiments of the present invention, execution unit 114 is configured to perform a single operation or instruction. In some embodiments of the present invention, execution unit 114 is configured to perform a multiple operations or instructions.

Based on the data result, execution unit 114 may generate a condition code, which includes flags or other representations that indicate that the data result generated by execution unit 114 may include errors or exceptions when performing an operation. Examples of conditions that a condition code may represent include, but are not limited to, an overflow or underflow condition. An overflow condition occurs in a floating point number when the exponent of the floating point number exceeds the value that the representation of the exponent in computing device 110 is capable of storing. An underflow condition occurs when the exponent becomes smaller than the value that the representation of the exponent in computing device 110 is capable of storing.

Early generation of a condition code can be particularly useful when there is not much latency between when a floating point operation that sets a condition code is issued and when the condition code is used by a branch instruction. For instance, consider a scenario where an instruction set architecture (ISA) allows for a condition code to be set based upon a comparison operation. The comparison may use registers that are set by, or depend on, the results of a prior floating point operation. In some embodiments of the present invention, an ISA allows for condition codes to be set directly by a floating point operation (e.g., add, subtract, or convert). Thus, it is possible that a branch instruction may immediately follow a floating point operation that sets the condition code. The resulting reduction in latency between the floating point operating and use of a dependent condition code can be facilitated by early generation of the condition code by condition code anticipator 116 during the execution of the floating point operation upon which the condition code depends.

In some embodiments of the present invention, condition code anticipator 116 includes condition code generator logic that can anticipate a condition code based on the instruction and input data operands prior to the execution unit generated a data result from the instruction and input data operands in hexadecimal format. The condition code generator logic can determine a value for the condition code based upon analysis of the operands data and the instruction. As a result, in a high frequency design the condition code generator logic can begin determining the condition code before the value of the floating point number is known. This can allow for the condition code to be available for use two or more cycles sooner. For example, in some embodiments of the present invention, for an instruction or operation performed by execution unit 114, condition code anticipator 116 is configured to anticipate, prior to normalization performed by execution unit 114, which condition code will occur. A condition code is a classification of the result. This is not only for exception cases. For example one classification is: zero result/positive result/negative result/exception. In some embodiments of the present invention, condition code anticipator 116 receives preprocessed input data from execution unit 114. Based on the exponent difference of the input operands, condition code anticipator 116 generates a mask to evaluate the significand of the intermediate result. A mask is a series of bits that passes through the value of certain bits of the significand (e.g., maintain or keep the bit value of the significand). The mask also forces or overwrites other bits to be certain of the value.

Figure 2:
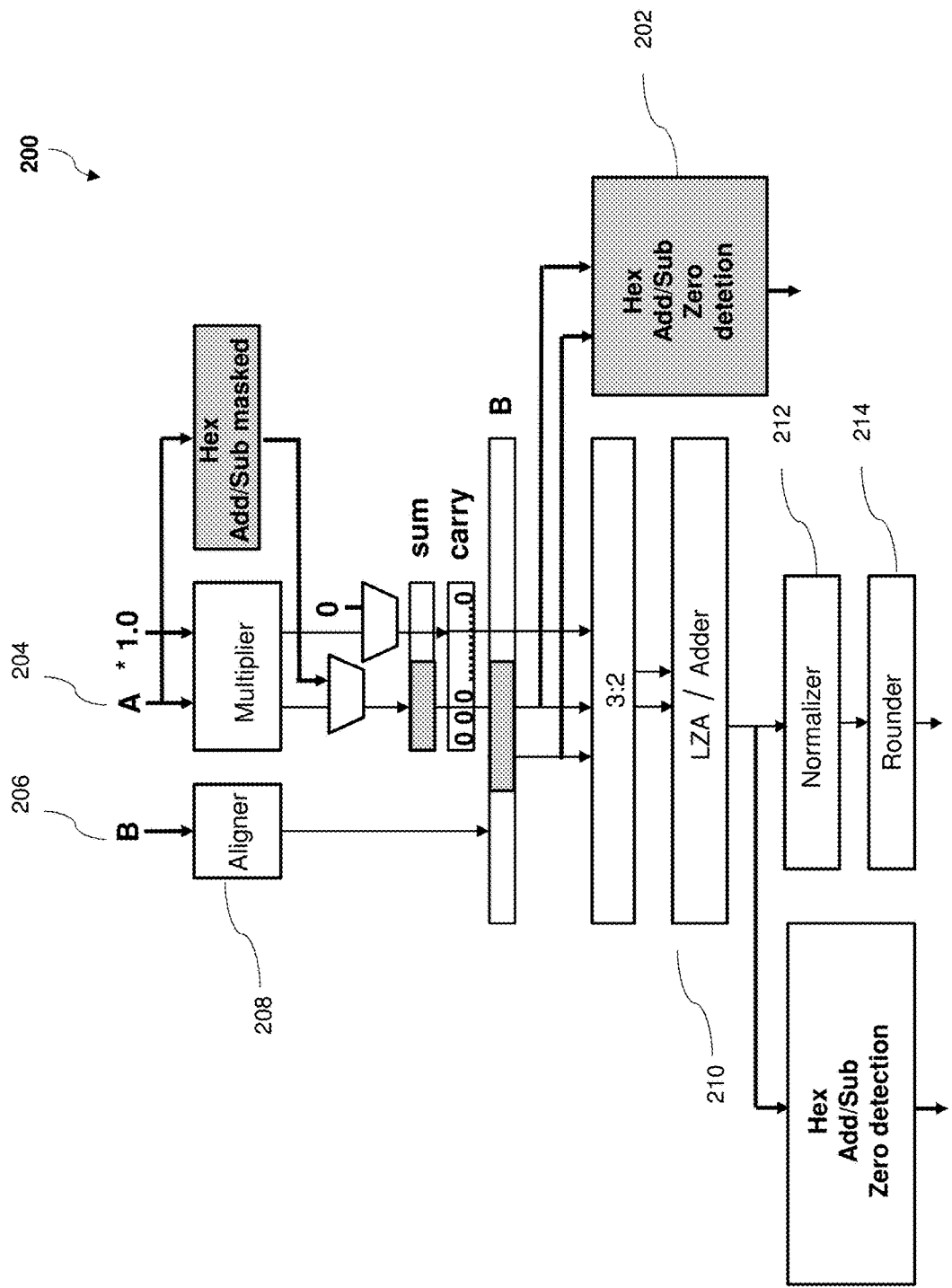
FIG. 2 depicts a block diagram of a fused multiply-add (FMA) unit of floating point operation unit with condition code logic for detecting zero in hexadecimal calculations in accordance with one or more embodiments of the present invention.

FIG. 2 depicts a block diagram of a fused multiply-add unit 200 of a floating point operation unit with condition code logic for detecting zero in hexadecimal calculations in accordance with one or more embodiments of the present invention. As discussed in more detail herein, hexadecimal zero detection logic 202 (e.g., condition code anticipator 116 logic of FIG. 1) can be configured to generate condition codes based upon data from the floating point operation unit. More particularly, the data can be obtained from a point prior to normalization and rounding (depicted by blocks 212 and 214, respectively).

Operands 204 and 206 (i.e., operands A and B) represent input floating point values to be processed by the floating point operation unit. The components of the operands define their respective floating point value by: the sign (+/−), exponent, significand, or mantissa. Aligner 208 is used to shift the mantissa of input operand B according to the exponent difference of input operands A and B. In some embodiments of the present invention, aligner 208 is configured to shift the significand of one of the operands 204 and 206 to match the other of the operands. In some embodiments of the present invention, leading zero anticipator (LZA)/floating point adder 210 is configured to perform an arithmetic operation on operands 204 and 206 (e.g., addition, subtraction or compare). The result can then be normalized by normalization shifter block 212 and rounded by rounding block 214. The resulting floating point number can then be sent to the appropriate register file and/or directly for use by other instructions.

Hexadecimal zero detection logic 202 is configured to perform unnormalized and/or normalized HFP arithmetic operations to determine an appropriate condition code based on the operands 204, 206. In regards to the unnormalized HFP arithmetic, hexadecimal zero detection logic 202 is configured to swap the operands 204, 206 based on an exponent difference between the operands, in which the smaller operand is aligned to the larger operand. A result of the arithmetic operation is then checked against zero without guard digit. A zero result can be detected for HFP addition and subtraction in parallel to when the floating-point adder is performing the arithmetic operation.

Figure 3:
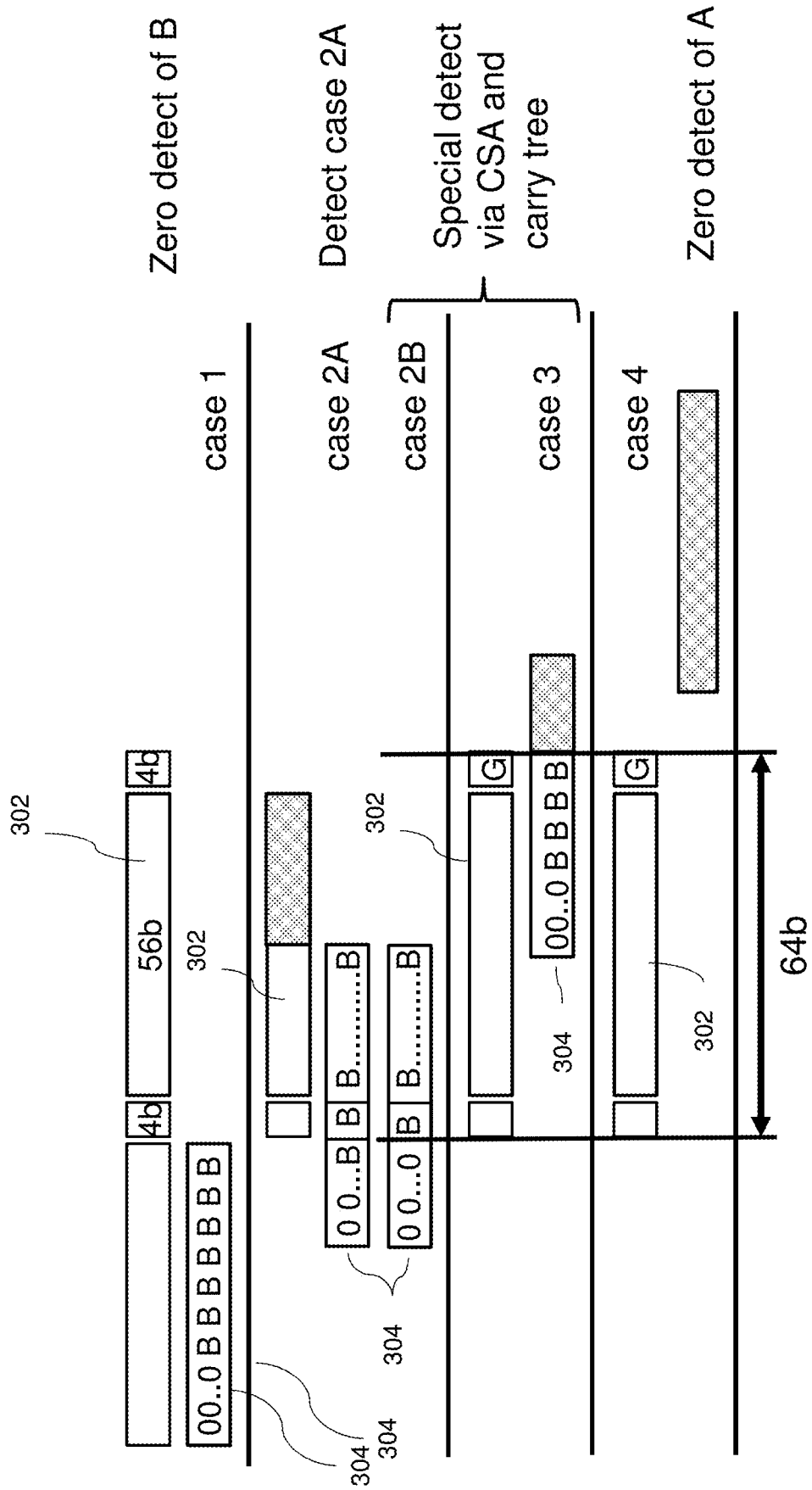
FIG. 3 depicts a block diagram of an example set of alignment cases for performing hexadecimal unnormalized zero detection in accordance with one or more embodiments of the present invention.

FIG. 3 sets forth a summary of example cases for performing hexadecimal unnormalized zero detection of a set of operands (i.e., Operand A 302 and Operand B 304) in accordance with one or more embodiments of the present invention. Case 1 involves detection of a zero data result based on detection of zero of operand B, case 2A involves circumstances where a detection of a zero result cannot occur, case 2B and case 3 involve special detection via a carry save adder and carry tree(s), and case 4 involves detection of zero data result based on detection of zero for operand A.

Figure 4:
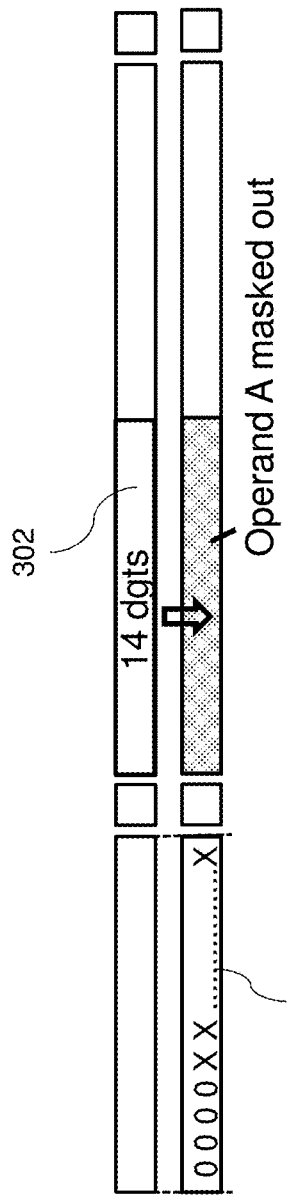
FIG. 4 depicts a block diagram of an example first alignment case (i.e., case 1) for hexadecimal unnormalized zero detection in accordance with one or more embodiments of the present invention.

In regards to case 1, hexadecimal alignment operations occur where the exponent of operand B is much greater than the exponent of operand A (i.e., Eb>>Ea) such as when the exponent of operand B is greater than or equal to the exponent of operand A plus the number of mantissa digits plus two (i.e., Eb>=Ea+number of mantissa digits+2). FIG. 4 illustrates an example embodiment of case 1 in accordance with one or more embodiments of the present invention. In case 1, operand A 302 is masked out and thus, in such a case, the result of the arithmetic can be only if the fraction of operand B 304 is zero.

Figure 5:
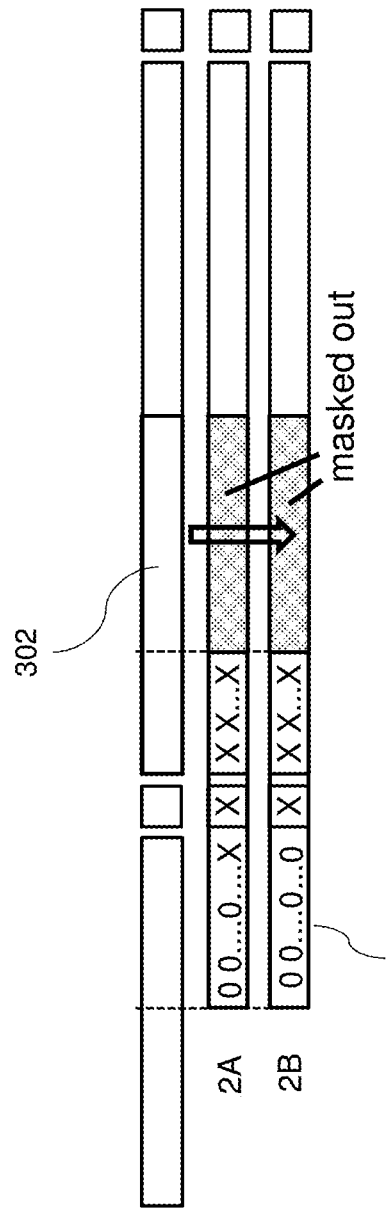
FIG. 5 depicts a block diagram of an example set of second alignment cases (i.e., cases 2A and 2B) for hexadecimal unnormalized zero detection in accordance with one or more embodiments of the present invention.

In regards to case 2A and 2B alignment operations, such cases occur when the mantissa of the operands, after alignment shift of the operands, overlap. For example, case 2A occurs where the exponent of operand B minus the number of leading zeros is greater than or equal to the exponent of operand A plus two (i.e., Eb−lz>=Ea+2). In case 2A, the result of the arithmetic can never be zero. In contrast, in regards to case 2B, case 2B under hexadecimal unnormalized conditions occurs where the exponent of operand B minus the number of leading zeros is less than or equal to the exponent of operand A plus one (i.e., Eb−lz<=Ea+1). FIG. 5 illustrates an example embodiment of two types of cases under case 2 in accordance with one or more embodiments of the present invention (i.e., case 2A and case 2B).

In regards to case 2B unnormalized alignment operations, a detection is performed to detect whether the arithmetic operation includes an effective addition operation and/or an effective subtraction operation. In the context of an effective addition operation, a first variable is utilized that depends on the exponent difference between operand A and operand B and dependent on the number of leading zero digits. For example, in the context of an effective add under case 2B, a first variable in hexadecimal format is utilized, in which the number of i-digits of the first variable are set to "F", in which the number of i-digits is calculated based on the following: i=Eb−lz−Ea+1+len(ma), in which lz represents the number of leading zero digits of operand B, in which len(ma) represents the length of the data mantissa width in digits, in which the width may be based on single precision, double precision, or extended precision. In some embodiments of the present invention, in an effective addition, the first variable is formatted as [F F F F . . . F 0 0 0 0], in which the number of Fs is the number of i-digits, in which the length of the first variable is equal to the length of the data mantissa width (i.e., len(ma)). In this example, if the index position of the first variable starts at position 0, digits at position 0 through i−1 would be set to "F", whereas digits at position i to len(ma)−1 would be set to "0".

As used herein, an effective subtraction occurs when an addition operation is performed on operands with opposite signs, or when a subtraction operation is performed on operands with like signs. Accordingly, the determination can be accomplished by comparing the signs of the two operands in view of whether the operation specifies an addition or subtraction. For instance, if the instruction operation specifies an addition and the signs do not match (one is positive and one is negative) then the operation is an effective subtract; otherwise, the operation is an effective addition. Similarly, if the instruction operation specifies a subtraction and the signs match (both are positive or both are negative) then the operation is an effective subtract; otherwise, the operation is an effective addition. If the operation is not an effective subtraction, then if the result is zero then the condition code is set to indicate a zero result. The condition code for zero result has priority over the condition code of positive/negative result. An effective addition can also lead to a zero result.

Figure 8:
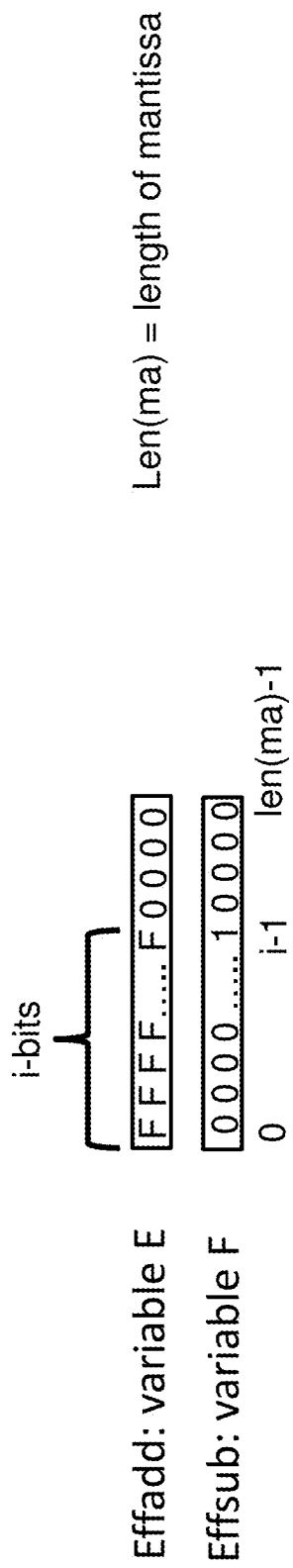
FIG. 8 depicts a block diagram of example first and second variables in accordance with one or more embodiments of the present invention.

FIG. 6 illustrates an example effective addition operation and associated carry tree in accordance with one or more embodiments of the present invention, in which variable E is the first variable referenced above. In regards to the detection of zero in such an unnormalized effective addition operation, the data result is detected as being equal to zero if the output of the carry tree of the effective addition is "0". An example of variable E can be found in FIG. 8.

In the context of an unnormalized effective subtraction operation (i.e., absolute difference) under case 2B, a second variable is utilized that depends on the exponent difference between operand A and operand B and depends on the number of leading zeros. For example, in the context of an subtraction under case 2B, a second variable in hexadecimal format is utilized, in which the number of i-digits minus one of the first variable are set to "0", in which the number of i-digits is calculated based on the following: i=Eb−lz−Ea+1+len(ma), in which lz represents the number of leading zero digits of operand B, in which len(ma) represents the length of the data mantissa width in digits, in which the width may be based on single precision, double precision, or extended precision. In this example, if the index position of the second variable starts at position 0 and ends at position len(ma)−1, the digit at position i−1 would be set to "1", whereas all other digits at would be set to "0".

Figure 7:
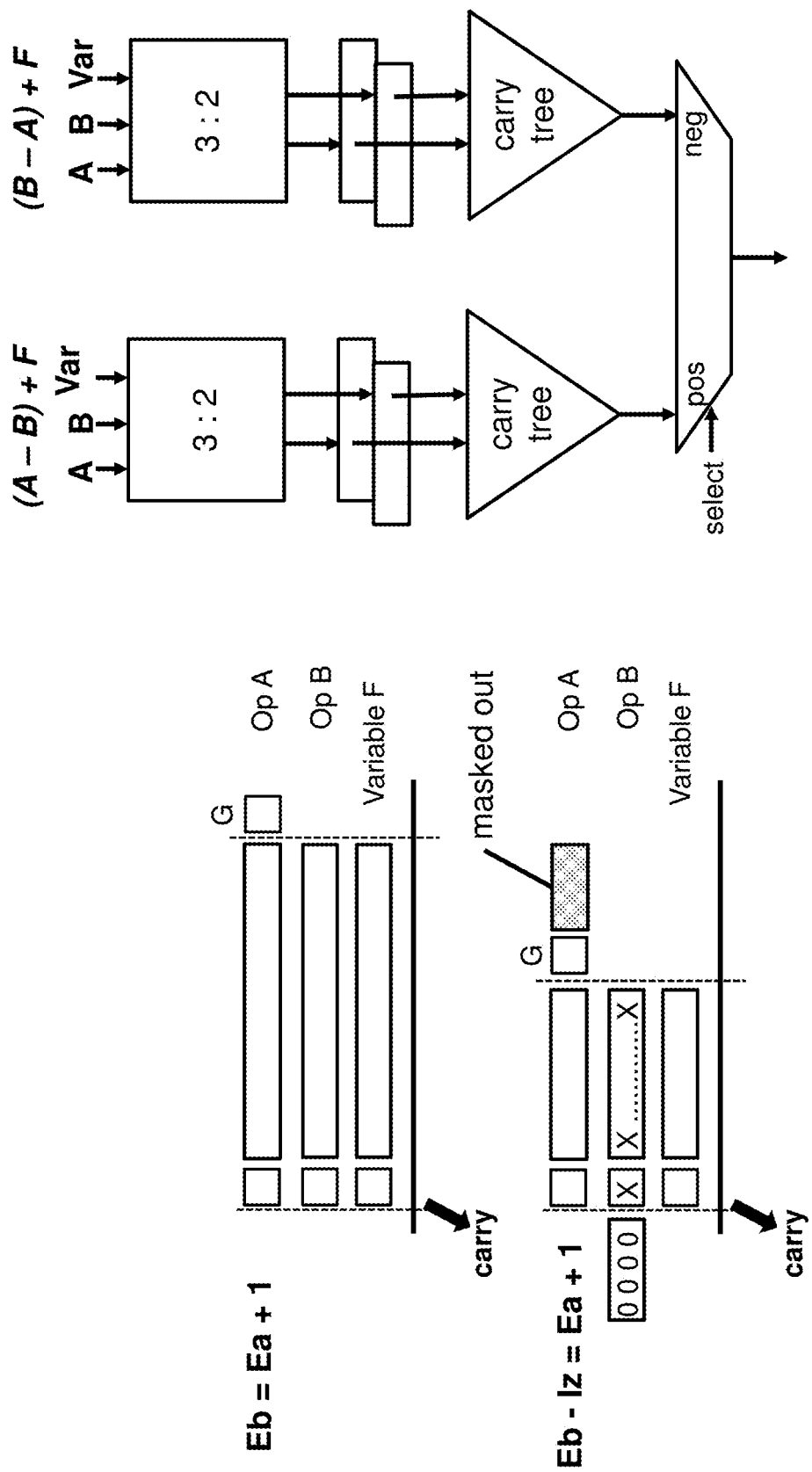
FIG. 7 depicts a block diagram of an example effective hexadecimal unnormalized subtraction operation and associated carry tree of a second of the set of second alignment cases of FIG. 5 in accordance with one or more embodiments of the present invention, in which a second variable (i.e., variable F) is utilized.

FIG. 7 illustrates an example effective subtraction operation and associated carry trees in accordance with one or more embodiments of the present invention, in which variable F is the second variable referenced above. In regards to the detection of zero in such an unnormalized effective subtraction operation, the data result is detected as being equal to zero if the output of the subtraction carry tree is "1". An example of variable F can be found in FIG. 8

Figure 9:
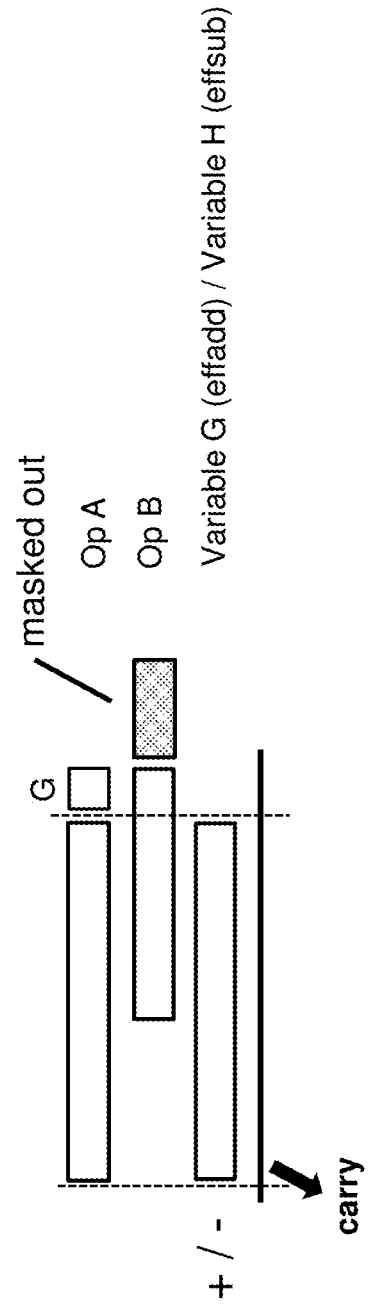
FIG. 9 depicts a block diagram of an example third alignment case (i.e., case 3) for hexadecimal unnormalized zero detection in accordance with one or more embodiments of the present invention, in which a third variable (i.e., variable G) and/or a fourth variable (i.e., variable H) are utilized.
Figures 10, 11:
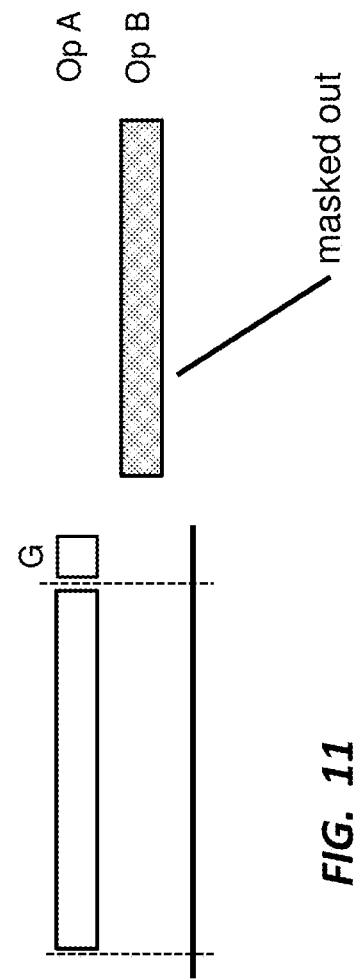
FIG. 10 depicts a block diagram of example third and fourth variables in accordance with one or more embodiments of the present invention.
FIG. 11 depicts a block diagram of an example fourth alignment case (i.e., case 4) for hexadecimal unnormalized zero detection in accordance with one or more embodiments of the present invention.

Referring back to FIG. 3, in regards to case 3 unnormalized alignment operations, such case occurs where the exponent of operand A is greater than or equal to the exponent of operand B (i.e., Ea>=Eb). Similar to case 2B, case 3 utilizes a third and/or fourth variable to perform an effective addition and/or effective subtraction respectively, in which the length of the third and fourth variables are the length of the data mantissa without guard digit. For example, in regards to the effective addition under case 3, a third variable in hexadecimal format is utilized, in which all the digits of the third variable are set to 'F", if the index position of the third variable starts at position 0, the last position of the third variable would be len(ma)−1. The length of the third variable is equal to the length of the mantissa width. In contrast, in regards to the effective subtraction under case 3, a fourth variable in hexadecimal format is utilized, in which all the digits of the third variable are set to '0" except for the last digit, which is set to "1". In this example, if the index position of the fourth variable starts at digit position 0, the last digit position of the fourth variable would be len(ma)−1, in which the last digit (i.e., digit at position len(ma)−1) is set to "1". The length of the fourth variable is equal to the length of the mantissa width. FIG. 9 illustrates an example embodiment of case 3 in accordance with one or more embodiments of the present invention. FIG. 10 illustrates an example of the third and fourth variable in accordance with one or more embodiments of the present invention, in which the third variable is referenced as variable G and the fourth variable is referenced as variable H.

In regards to case 4 alignment operations, case 4 occurs when the exponent of operand A is much greater than the exponent of operand B (i.e., Ea>>Eb). This may occur, for example, when the exponent of operand A is greater than or equal to the exponent of operand B plus the number of mantissa digits (i.e., Ea>=Eb+number of mantissa digits). In instances where case 4 occurs, the data result is detected as being zero if the fraction of operand A is equal to zero. FIG. 11 illustrates an example embodiment of case 4 in accordance with one or more embodiments of the present invention.

Figure 12:
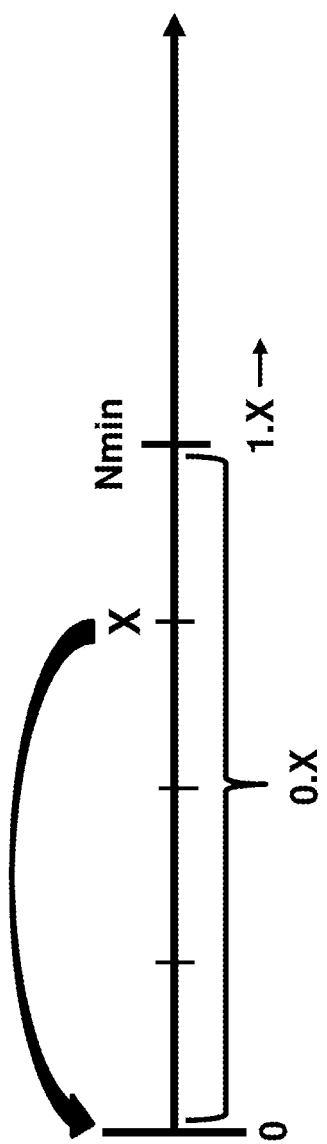
FIG. 12 depicts a graph of an example hexadecimal floating point normalized definition in accordance with one or more embodiments of the present invention.

In hexadecimal floating point arithmetic, hexadecimal floating point normalization is utilized to force a number to zero if the number is too small for representation. FIG. 12 illustrates a normalized definition for a representation of a number X where the number X is said to be less than a predetermined minimum number (|X|<Nmin) for numbers from 0.X to 1.X and beyond, in which Nmin is defined as the smallest number which can be represented with normalization (i.e., no leading zeros).

Case 2B under hexadecimal normalized alignment conditions occurs when the exponent of operand B minus the number of leading zeros is less than or equal to the exponent of operand A plus one (i.e., Eb>Ea, Eb−lz<=Ea+1). A detection is performed to detect whether the arithmetic operation includes an effective addition operation and/or an effective subtraction operation. In the context of an effective addition operation, a fifth variable is utilized that depends on the exponent difference between operand A and the smallest valid exponent (i.e., Emin). For example, in the context of an effective add under case 2B, a fifth variable in hexadecimal format is utilized, in which the number of i-digits of the fifth variable are set to "F"," in which the number of i-digits is calculated based on the following: i=min(len(ma), Ea−Emin)+1, in which len(ma) represents the length of the data mantissa width in digits, in which the width may be based on single precision, double precision, or extended precision. In some embodiments of the present invention, in an effective addition, the fifth variable is formatted as [F F F F F . . . F 0 0 0 0], in which the number of Fs is the number of i-digits, in which the length of the fifth variable is equal to the length of the data mantissa width (i.e., len(ma)). In this example, if the index position of the fifth variable starts at position 0, digits at position 0 through i−1 would be set to "F", whereas digits at position i to len(ma)−1 would be set to "0".

FIG. 13 illustrates an example of case 2B of a normalized effective addition operation and associated carry tree in accordance with one or more embodiments of the present invention, in which variable L is the fifth variable referenced above. In regards to the detection of zero in such a normalized effective addition operation, the data result is detected as being less than Nmin if the output of the carry tree of the effective addition is "0".

In the context of an effective subtraction operation for hexadecimal normalized alignment conditions (i.e., absolute difference) under case 2B, a sixth variable is utilized that depends on the exponent difference between operand A and Emin, in which the number of i-digits minus one of the sixth variable are set to "0", in which the number of i-digits is calculated based on the following: i=min(len(ma), Ea−Emin)+1, in which len(ma) represents the length of the data mantissa width in digits, in which the width may be based on single precision, double precision, or extended precision. In this example, if the index position of the sixth variable starts at position 0 and ends at position len(ma)−1, the digit at position i−1 would be set to "1", whereas all other digits at would be set to "0". FIG. 14 illustrates an example of the fifth and sixth variables in accordance with one or more embodiments of the present invention, in which the fifth variable is referenced as variable L and the sixth variable is referenced as variable M.

In regards to case 3 normalized alignment operations, such case occurs when the exponent of operand A is greater than or equal to the exponent of operand B (i.e., Ea>=Eb)

and the exponent of operand A is greater than or equal to the smallest valid exponent plus the length of the data mantissa in digits (i.e., Ea>=Emin+len(ma)). Similar to case 2B, case 3 utilizes a seventh and/or eighth variable to perform an effective addition and/or effective subtraction respectively, in which the seventh and eighth variables are the length of the data mantissa without guard digit. For example, in regards to the effective addition under case 3, a seventh variable in hexadecimal format is utilized, in which all the digits of the seventh variable are set to 'F', if the index position of the third variable starts at position 0, the last position of the seventh variable would be len(ma)−1. The length of the seventh variable is equal to the length of the mantissa width. In contrast, in regards to the effective subtraction under case 3 normalized operation, an eighth variable in hexadecimal format is utilized, in which all the digits of the eighth variable are set to '0' except for the last digit, which is set to "1". In this example, if the index position of the eighth variable starts at digit position 0, the last digit position of the fourth variable would be len(ma)−1, in which the last digit (i.e., digit at position len(ma)−1) is set to "1". The length of the eighth variable is equal to the length of the mantissa width. FIG. 15 illustrates an example of the seventh and eighth variables in accordance with one or more embodiments of the present invention, in which the seventh variable is referenced as variable N and the eighth variable is referenced as variable O.

Figure 16:
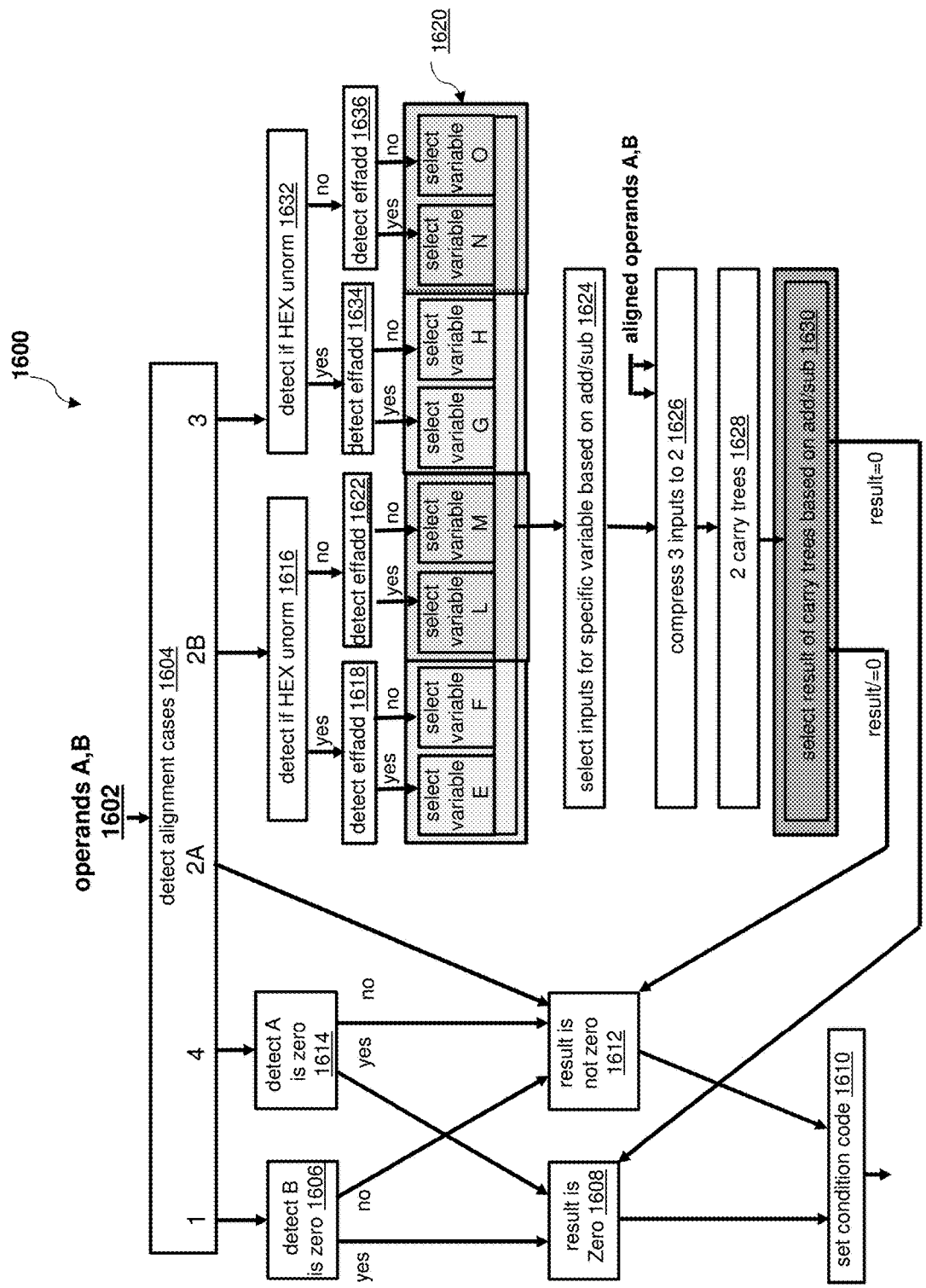
FIG. 16 depicts a flow diagram illustrating a methodology in accordance with one or more embodiments of the present invention.

Additional details of the operation of hexadecimal zero detection logic 202 of FIG. 2 will now be described with reference to FIG. 16, in which FIG. 16 depicts a flow diagram illustrating a methodology 1600 according to one or more embodiments of the present invention. At block 1602 two or more operands are received, such as, for example, an operand A and an operand B. At block 1604, alignment cases are detected to ascertain if case 1, 2A, 2B, 3, or 4 apply to the operands.

In some embodiments of the present invention, if at block 1604 it is detected that case 1 is to be applied, then at block 1606 it is detected whether operand B is zero. If operand B is zero then at block 1608 the result is zero and at block 1610 the condition code is set based on the result being zero. If operand B is not zero then at block 1612 the result is non-zero and at block 1610 the condition code is set based on the result being non-zero. The data result and/or the condition code are then outputted to a processor core.

In some embodiments of the present invention, if at block 1604 it is detected that case 4 is to be applied, then at block 1614 it is detected whether operand A is zero. If operand A is zero then at block 1608 the result is zero and at block 1610 the condition code is set based on the result being zero. If operand A is non-zero then at block 1612 the result is non-zero and at block 1610 the condition code is set based on the result being non-zero. The data result and/or the condition code are then outputted to the processor core.

In some embodiments of the present invention, if at block 1604 it is detected that case 2A is to be applied, then at block 1612 the result is non-zero and at block 1610 the condition code is set based on the result being non-zero. The data result and/or the condition code are then outputted to the processor core.

In some embodiments of the present invention, if at block 1604 it is detected that case 2B is to be applied, then at block 1616 a determination is made as to if a hexadecimal unnormalized operation of the operands is to occur or if a hexadecimal normalized operation of the operands is to occur. In some embodiments of the present invention, in response to detecting at block 1616 that a hexadecimal unnormalized operation is to occur, then at block 1618 a determination is made as to if an effective addition or subtraction operation is to occur. If it is detected at block 1618 that an effective addition is to occur, then at block 1620 a first variable is selected (e.g., variable E of FIG. 8). If it is detected at block 1618 that an effective subtraction is to occur, then at block 1620 a second variable is selected (e.g., variable F of FIG. 8). If it is detected at block 1616 that a hexadecimal normalized operation is to occur, then at block 1622 a determination is made as to if an effective addition or subtraction operation is to occur. If at block 1622 it is detected that an effective addition is to occur, then at block 1620 a fifth variable is selected (e.g., variable L of FIG. 14). If at block 1622 it is detected that an effective subtraction is to occur, then at block 1620 a sixth variable is selected (e.g., variable M of FIG. 14).

In some embodiments of the present invention, in the context of case 2B, after selecting at block 1620 between the first, second, fifth, or sixth variables, then at block 1624 a set of three inputs are selected based on the whether the effective addition and/or subtraction was detected, in which the inputs include operand A, operand B, and the selected variable. At block 1626 operands A and B are aligned and the three inputs are compressed from three to two. At block 1628, the compressed inputs are passed to a set of carry trees (e.g., two carry trees), which receive the compressed inputs and determine whether the arithmetic operation results in a carry bit. At block 1630, a result of the carry trees is selected based on whether the arithmetic operation performed on the operands is an addition operation or a subtraction operation. If at block 1630 the selection indicates a zero result, then at block 1608 the data result is zero and at block 1610 the condition code it set based on the result being zero. If at block 1630 the selection indicates a non-zero result, then at block 1608 the data result is non-zero and at block 1610 the condition code it set based on the data result being non-zero. The data result and/or the condition code are then outputted to the processor core.

In some embodiments of the present invention, the selection of the result at block 1630 includes checking whether there was an effective addition operation by checking whether the following Boolean Expression is true: (sign of operand A) XNOR (sign of operand B) AND (add_op). If there is an effective addition operation, then "1" is selected. If there is no effective addition operation and if operand of A is greater than the operand of B, then "1" is selected. If there is no effective addition operation and if operand of A is not greater, than the operand of B, then "0" is selected. See FIG. 17.

In some embodiments of the present invention, if at block 1604 it is detected that case 3 is to be applied, then at block 1632 a determination is made as to if a hexadecimal unnormalized operation of the operands is to occur or if a hexadecimal normalized operation of the operands is to occur. In some embodiments of the present invention, in response to detecting at block 1632 that a hexadecimal unnormalized operation is to occur, then at block 1634 a determination is made as to if an effective addition or subtraction operation is to occur. If it is detected at block 1634 that an effective addition is to occur, then at block 1620 a third variable is selected (e.g., variable G of FIG. 10). If it is detected at block 1634 that an effective subtraction is to occur, then at block 1620 a fourth variable is selected (e.g., variable H of FIG. 10). If it is detected at block 1632 that a hexadecimal normalized operation is to occur, then at block 1636 a determination is made as to if an effective addition or subtraction operation is to occur. If at block 1636 it is detected that an effective addition is to occur, then at block 1620 a seventh variable is selected (e.g., variable N of FIG. 15). If at block 1636 it is detected that an effective subtraction is to occur, then at block 1620 an eighth variable is selected (e.g., variable O of FIG. 15). In the context of case 3, after the selection of the variables the process proceeds through blocks 1624, 1626, 1628, and 1630 in a manner similar to the one identified above in reference to case 2B.

Figure 17:
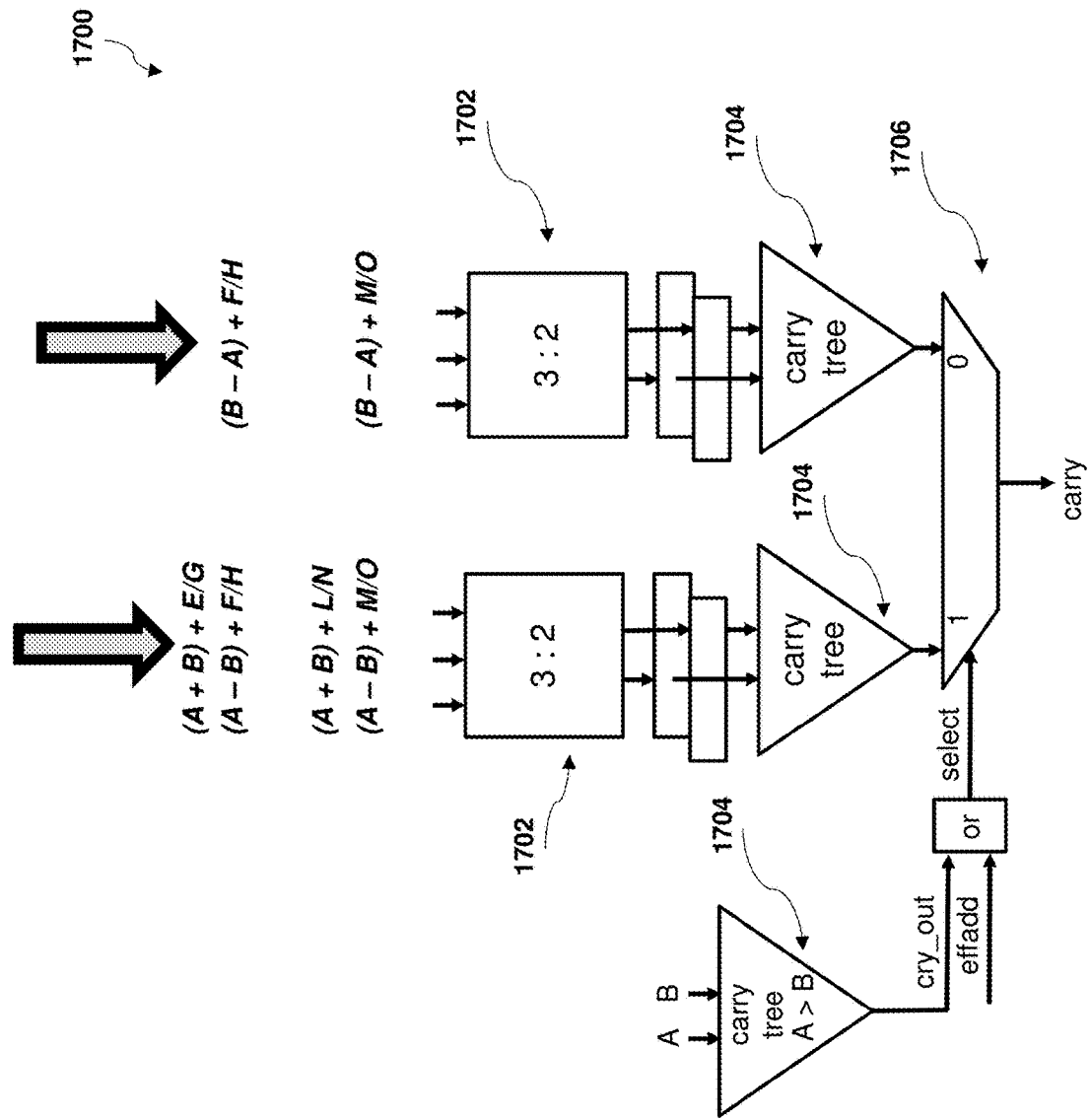
FIG. 17 depicts an exemplary logic circuitry capable of implementing the methodology of FIG. 16 in accordance with one or more embodiments of the present invention.

FIG. 17 illustrates example logic circuitry 1700 for use by a floating point unit to implement methodology 1600 in accordance with one or more embodiments of the present invention. Logic circuitry 1700 implements hexadecimal addition and subtraction for unnormalized and normalized alignment operations. Logic circuitry 1700 includes one or more carry save adders (CSAs) each having a three-to-two compressor 1702, in which each three-to-two compressor 1702 receives as inputs at least a first operand (e.g., operand A), a second operand (e.g., operand B), and a variable (e.g., Variable E, F, G, H, L, M, N, O, etc.). Logic circuitry 1700 further includes one or more carry trees 1704, and a selection multiplexer 1706.

Figure 18:
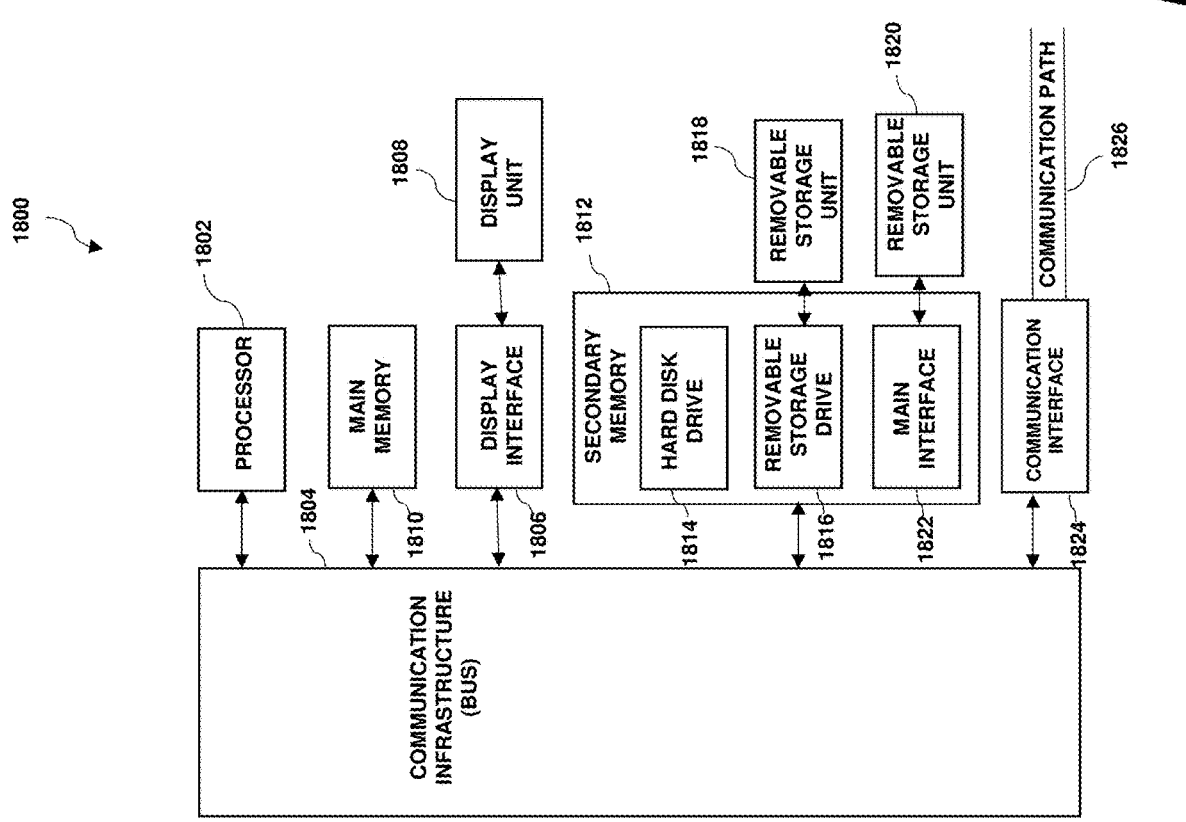
FIG. 18 depicts an exemplary computer system capable of implementing one or more embodiments of the present invention.

FIG. 18 illustrates a high-level block diagram showing an example of a computer-based system 1800 useful for implementing one or more embodiments of the invention. Although one exemplary computer system 1800 is shown, computer system 1800 includes a communication path 1826, which connects computer system 1800 to additional systems and may include one or more wide area networks (WANs) and/or local area networks (LANs) such as the internet, intranet(s), and/or wireless communication network(s). Computer system 1800 and additional systems are in communication via communication path 1826, (e.g., to communicate data between them).

Computer system 1800 includes one or more processors, such as processor 1802. Processor 1802 is connected to a communication infrastructure 1804 (e.g., a communications bus, cross-over bar, or network). Computer system 1800 can include a display interface 1806 that forwards graphics, text, and other data from communication infrastructure 1804 (or from a frame buffer not shown) for display on a display unit 1808. Computer system 1800 also includes a main memory 1810, preferably random access memory (RAM), and may also include a secondary memory 1812. Secondary memory 1812 may include, for example, a hard disk drive 1814 and/or a removable storage drive 1816, representing, for example, a floppy disk drive, a magnetic tape drive, or an optical disk drive. Removable storage drive 1816 reads from and/or writes to a removable storage unit 1818 in a manner well known to those having ordinary skill in the art. Removable storage unit 1818 represents, for example, a floppy disk, a compact disc, a magnetic tape, or an optical disk, etc. which is read by and written to by removable storage drive 1816. As will be appreciated, removable storage unit 1818 includes a computer readable medium having stored therein computer software and/or data.

In some alternative embodiments of the invention, secondary memory 1812 may include other similar means for allowing computer programs or other instructions to be loaded into the computer system. Such means may include, for example, a removable storage unit 1820 and an interface 1822. Examples of such means may include a program package and package interface (such as that found in video game devices), a removable memory chip (such as an EPROM or PROM) and associated socket, and other removable storage units 1820 and interfaces 1822 which allow software and data to be transferred from the removable storage unit 1820 to computer system 1800.

Computer system 1800 may also include a communications interface 1824. Communications interface 1824 allows software and data to be transferred between the computer system and external devices. Examples of communications interface 1824 may include a modem, a network interface (such as an Ethernet card), a communications port, a PCM-CIA slot and card, etcetera. Software and data transferred via communications interface 1824 are in the form of signals which may be, for example, electronic, electromagnetic, optical, or other signals capable of being received by communications interface 1824. These signals are provided to communications interface 1824 via communication path (i.e., channel) 1826. Communication path 1826 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 1810 and secondary memory 1812, removable storage drive 1816, and a hard disk installed in hard disk drive 1814. Computer programs (also called computer control logic) are stored in main memory 1810, and/or secondary memory 1812. Computer programs may also be received via communications interface 1824. Such computer programs, when run, enable the computer system to perform the features of the present disclosure as discussed herein. In particular, the computer programs, when run, enable processor 1802 to perform the features of the computer system. Accordingly, such computer programs represent controllers of the computer system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

What is claimed is:

1. A computer-implemented method comprising:
   executing, by a binary based floating-point arithmetic unit of a processor, a calculation comprising two or more operands in hexadecimal format based on a hexadecimal floating-point (HFP) instruction; and
   providing, by the floating-point arithmetic unit, a condition code for a calculation result of the calculation,
   wherein the floating-point arithmetic unit includes a condition code anticipator circuit that is configured to provide the condition code to the processor prior to availability of the calculation result, and
   wherein the condition code anticipator circuit detects a zero result in at least one case where the calculation result is mathematically non-zero when the calculation result is unnormalized and zero when the calculation result is normalized.

2. The computer-implemented method of claim 1, wherein the condition code anticipator circuit is further configured to detect the zero result for HFP addition and subtraction in parallel to a floating-point adder.

3. The computer-implemented method of claim 2, wherein the detecting the zero result by the condition code anticipator circuit comprises:
   detecting one or more alignment cases that are to be applied to the two or more operands;
   detecting whether a first of the two or more operands is zero;
   detecting whether a second of the two or more operands is zero; and
   detecting the zero result based, at least in part, on N+2 digits of the two or more operands, where N is the number of mantissa digits of the calculation result in HFP for a given precision.

4. The computer-implemented method of claim 3, wherein the given precision is double precision and N is 14 digits.

5. The computer-implemented method of claim 3, wherein the detecting of the zero result based, at least in part, on N+2 digits of the two or more operands is performed on at least a first or second alignment case of the one or more alignment cases, wherein the first alignment case comprises where an exponent of the second operand minus number of leading zeros is less than or equal to an exponent of the first operand plus one.

6. The computer-implemented method of claim 5, wherein the second alignment case comprises where the exponent of the first operand is greater than or equal to the exponent of the second operand.

7. The computer-implemented method of claim 1, wherein the condition code anticipator circuit comprises:
one or more carry save adders (CSAs), wherein each CSA includes a three-to-two compressor, in which each three-to-two compressor receives as inputs at least the first operand, the second operand, and a variable;
one or more carry trees; and
a selection multiplexer.

8. A computer program product comprising a computer readable storage medium having program instructions embodied therewith, wherein the computer readable storage medium is not a transitory signal per se, the program instructions executable by a system comprising one or more processors to cause the system to perform a method comprising:
executing, by a binary based floating-point arithmetic unit of a processor of the system, a calculation comprising two or more operands in hexadecimal format based on a hexadecimal floating-point (HFP) instruction; and
providing, by the floating-point arithmetic unit, a condition code for a calculation result of the calculation,
wherein the floating-point arithmetic unit includes a condition code anticipator circuit that is configured to provide the condition code to the processor prior to availability of the calculation result, and
wherein the condition code anticipator circuit detects a zero result in at least one case where the calculation result is mathematically non-zero when the calculation result is unnormalized and zero when the calculation result is normalized.

9. The computer program product of claim 8, wherein the condition code anticipator circuit is further configured to detect the zero result for HFP addition and subtraction in parallel to a floating-point adder.

10. The computer program product of claim 9, the detecting the zero result by the condition code anticipator circuit comprises:
detecting one or more alignment cases that are to be applied to the two or more operands;
detecting whether a first of the two or more operands is zero;
detecting whether a second of the two or more operands is zero; and
detecting the zero result based, at least in part, on N+2 digits of the two or more operands, where N is the number of mantissa digits of the calculation result in HFP for a given precision.

11. The computer program product of claim 10, wherein the given precision is double precision and N is 14 digits.

12. The computer program product of claim 10, wherein the detecting of the zero result based, at least in part, on N+2 digits of the two or more operands is performed on at least a first or second alignment case of the one or more alignment cases, wherein the first alignment case comprises where an exponent of the second operand minus number of leading zeros is less than or equal to an exponent of the first operand plus one.

13. The computer program product of claim 12, wherein the second alignment case comprises where the exponent of the first operand is greater than or equal to the exponent of the second operand.

14. The computer program product of claim 8, wherein the condition code anticipator circuit comprises:
one or more carry save adders (CSAs), wherein each CSA includes a three-to-two compressor, in which each three-to-two compressor receives as inputs at least the first operand, the second operand, and a variable;
one or more carry trees; and
a selection multiplexer.

15. A system comprising a binary based floating-point arithmetic unit and one or more processors configured to perform a method comprising:
executing, by the binary based floating-point arithmetic unit, a calculation comprising two or more operands in hexadecimal format based on a hexadecimal floating-point (HFP) instruction; and
providing, by the floating-point arithmetic unit, a condition code for a calculation result of the calculation,
wherein the floating-point arithmetic unit includes a condition code anticipator circuit that is configured to provide the condition code to a processor prior to availability of the calculation result, and
wherein the condition code anticipator circuit detects a zero result in at least one case where the calculation result is mathematically non-zero when the calculation result is unnormalized and zero when the calculation result is normalized.

16. The system of claim 15, wherein the condition code anticipator circuit is further configured to detect the zero result for HFP addition and subtraction in parallel to a floating-point adder.

17. The system of claim 16, the detecting the zero result by the condition code anticipator circuit comprises:
detecting one or more alignment cases that are to be applied to the two or more operands;
detecting whether a first of the two or more operands is zero;
detecting whether a second of the two or more operands is zero; and
detecting the zero result based, at least in part, on N+2 digits of the two or more operands, where N is the number of mantissa digits of the calculation result in HFP for a given precision.

18. The system of claim 17, wherein the detecting of the zero result based, at least in part, on N+2 digits of the two or more operands is performed on at least a first or second alignment case of the one or more alignment cases, wherein the first alignment case comprises where an exponent of the second operand minus number of leading zeros is less than or equal to an exponent of the first operand plus one.

19. The system of claim 18, wherein the second alignment case comprises where the exponent of the first operand is greater than or equal to the exponent of the second operand.

20. The system of claim 15, wherein the condition code anticipator circuit comprises:
one or more carry save adders (CSAs), wherein each CSA includes a three-to-two compressor, in which each three-to-two compressor receives as inputs at least the first operand, the second operand, and a variable;
one or more carry trees; and
a selection multiplexer.

* * * * *